United States Patent [19]

Chapman

[11] Patent Number: 5,354,355
[45] Date of Patent: Oct. 11, 1994

[54] EARTH MELTER AND METHOD OF DISPOSING OF FEED MATERIALS

[75] Inventor: Christopher C. Chapman, Richland, Wash.

[73] Assignee: Battelle Memorial Institute, Richland, Wash.

[21] Appl. No.: 24,886

[22] Filed: Mar. 1, 1993

Related U.S. Application Data

[63] Continuation of Ser. No. 805,444, Dec. 9, 1991, abandoned.

[51] Int. Cl.⁵ ............................. C22B 9/20; C22B 9/21
[52] U.S. Cl. .......................................... 75/414; 75/10.1; 266/142; 405/129; 588/237
[58] Field of Search ................. 75/500, 585, 586, 712, 75/707, 414, 958, 10.1; 266/171, 176, 45, 168, 142, 287, 142; 405/129; 423/DIG. 20; 588/237

[56] References Cited

U.S. PATENT DOCUMENTS

| | | | |
|---|---|---|---|
| 1,898,926 | 2/1933 | Aarts et al | 266/187 |
| 4,376,598 | 3/1983 | Brouns et al. | 405/129 |
| 5,024,556 | 6/1991 | Timmerman | 405/129 |
| 5,114,277 | 5/1992 | Murphy et al. | 405/129 |

FOREIGN PATENT DOCUMENTS

4113182C1 8/1992 Fed. Rep. of Germany .
1320921 6/1963 France .

OTHER PUBLICATIONS

Ammen, C. W., *Recovery & Refining of Precious Metals* Van Nostrand Reinhold Co.., pp. 47 & 48, Oct. 13, 1985.

*Primary Examiner*—Melvyn J. Andrews
*Attorney, Agent, or Firm*—Stephen R. May

[57] ABSTRACT

An apparatus, and method of operating the apparatus, wherein a feed material is converted into a glassified condition for subsequent use or disposal. The apparatus is particularly useful for disposal of hazardous or noxious waste materials which are otherwise either difficult or expensive to dispose of. The apparatus is preferably constructed by excavating a melt zone in a quantity of soil or rock, and lining the melt zone with a back fill material if refractory properties are needed. The feed material is fed into the melt zone and, preferably, combusted to an ash, whereupon the heat of combustion is used to melt the ash to a molten condition. Electrodes may be used to maintain the molten feed material in a molten condition, and to maintain homogeneity of the molten materials.

41 Claims, 3 Drawing Sheets

EARTH MELTER AND METHOD OF DISPOSING OF FEED MATERIALS

This invention was made with Government support under Contract DE-AC06-76RLO 1830 awarded by the U.S. Department of Energy. The Government has certain rights in the invention.

This application is a continuation of Ser. No. 07/805,444 filed Dec. 9, 1991 now abandoned.

BACKGROUND OF THE INVENTION

The need for devices to effectively treat and dispose of waste materials without creating undue environmental contamination has been recognized for many years. Incinerators have been used to reduce municipal solid wastes to ash which must then be disposed of by conventional means, such as burial in a land fill. Incinerators have also been either used for, or proposed for, the disposal of other forms of commonly occurring waste products, such as medical wastes, low level nuclear wastes, hazardous organic or inorganic chemical wastes, etc.

For example, U.S. Pat. No. 4,299,611 discloses an incinerator for converting hazardous materials to a relatively harmless condition. Feed material, at least a portion of which is combustible, is directed into a conversion chamber and onto glass which is molten in the lower portion of the chamber. The waste is broken down into an ash component and a gaseous component. A portion of the ash settles into the molten glass, which is discharged to a cooling area to form a solid waste-glass product. Metallic portions of the waste are oxidized to metal oxides and then incorporated into the molten glass.

A number of other incinerator-type devices have been proposed to dispose of asbestos waste. In U.S. Pat. No. 4,820,328, asbestos is converted into a glass by mixing the asbestos with cullet and a melt accelerator, and introducing the mixture onto a quantity of molten glass in a furnace, thereby decomposing the asbestos. The molten glass/decomposed asbestos is withdrawn from the furnace at about 1000 degrees C. Likewise, in U.S. Pat. No. 4,678,493, asbestos is converted into a vitreous glass by introducing the asbestos into a two-chambered furnace. Glass is made from feed materials and cullet in a two-chambered furnace that is both electrically and gas fired in U.S. Pat. No. 4,831,633. Finally, an advanceable tin oxide electrode which can be advanced into additional sections of the furnace as the electrode advances so that the whole of the electrode material needed in a furnace campaign does not have to be present at the outset of the campaign, is disclosed in U.S. Pat. No. 4,897,853.

Waste materials for input into incinerators or other treatment means may take many varied forms. Such wastes may be combustible or noncombustible, solid or liquid. Regardless of the form of the waste upon entry into the treatment means, it must be converted into a form that can be used or disposed of without environmental insult. Depending upon the chemical constituents in the wastes, they must either be converted to harmless by-products, such as carbon dioxide or water, or alternatively, they must be immobilized (preferably in a much reduced volume) for permanent disposal or storage.

One source of noxious waste is the ash resulting from the incineration of municipal solid wastes (MSW ash). About 180 million tons of municipal solid waste is generated each year in the United States—about four pounds per person per day. About 13% is recycled, 73% is disposed of in land fills and 13% is incinerated, to yield about 10 million tons of MSW ash per year. Projections indicate that by the turn of the century up to 25% of MSW will be incinerated. The ashes sometimes contain potentially hazardous organics and heavy metals which can be leached into ground water. Typical disposal practices for these ashes are conventional land filling or disposal in a special ash disposal site.

It has been proposed that certain wastes can advantageously be melted, or vitrified, to reduce or eliminate the toxicity and disposal concerns. However, prior art melters suffer from high capital costs due to costly refractory materials that must be used. Generally speaking, fused cast refractory melters are held in position by a mechanical frame that must be capable of accommodating large thermal expansion. Adding to the expense of the device, the refractory material typically "wears out" after about 3 years of use. The precipitation and accumulation of metals on the refractory floor, resulting from the highly reducing conditions within the melter or from the content of metal in the feed, can result in accelerated failure of refractory materials by the phenomena known as "downward-drilling".

Because of these and other problems incident to current refractory lined melters, Applicant's invention represents a significant step forward in this art. This invention is relatively low cost and long lived, with a simple design allowing for easy construction and operation. Due to the design, the constraints of such a facility will be substantially less than with state-of-the-art refractory melter designs. In view of the foregoing, it is an object of the present invention to provide a method and apparatus for converting feed materials to a consolidated, relatively harmless melted condition, suitable to alternative productive uses or for long-term storage without environmental insult.

It is a further object of the invention to provide an apparatus that is easy and inexpensive to build, and which will convert feed materials to a glass or rock-like material having the hazardous constituents in the feed materials either destroyed or chemically bound in the discharged material.

These and other objects will become apparent from the following description.

SUMMARY OF THE INVENTION

The present invention resides in a novel melter design and method of operation. The melter design is low in cost, as it makes use of native soils, and/or rocks for its construction. The melter is primarily designed for the melting of waste materials, which may take the form of, e.g. municipal solid wastes (MSW), ash from the incineration of municipal solid wastes, medical wastes, hazardous chemical wastes, soils contaminated with hazardous wastes, etc.

More particularly, in its broadest embodiment, the apparatus of the present invention comprises an excavated area defining a melt zone, a cover over the excavated area to trap exhaust gasses and maintain a minimum temperature within the melt zone, a feed material inlet means through the cover, means for heating the feed (waste) material to produce a molten pool of melted feed material, and means to withdraw the melted feed material out of the melter for subsequent processing and use or disposal.

While it is contemplated that the apparatus will most likely be constructed by excavating an area below grade, it is contemplated that the device of this invention can be constructed above grade. If excavation occurs in soil, the excavated area may need to be lined with a backfill material to reduce the likelihood that the molten materials will rapidly corrode the walls of the excavated area. If the excavation is in soil having good refractory qualities, or in rock (such as basalt) the need for backfill will be reduced. If a suitable location for an in-grade excavation is not available, the apparatus of the present invention can be excavated in staged soils emplaced into a larger excavated area, or it can be excavated in soils contained in a vessel above ground. In the latter case, the melter can be a portable, movable apparatus.

In a preferred embodiment, a containment wall will be provided around the excavated area, to extend the life of the melter. The containment wall may be provided with cooling means to cool the soil adjacent the melter.

While any means capable of melting the feed material is contemplated herein, it is believed that the feed material will be incinerated or combusted, with the resulting ash being melted. Some feed materials, such as contaminated soils, will not be combusted, but rather melted from the outset. It is believed that by injecting a combustion-enhancing material (such as a hydrocarbon) with a combustible feed material stream, the feed materials will be completely combusted, and sufficient heat will be generated to melt the ash resulting from the combustion.

After the feed material is rendered ash (assuming it is not ash at the outset) and melted into a molten pool, a plurality of electric electrodes inserted into the molten pool serve to maintain the molten condition of the feed material, and convectively mix the molten feed materials to prevent stratification or separation of the various liquified constituents. The feed material accumulates, or "floats" above the molten pool, and the solid feed material is glassified, or melted, at the interface between the feed material and the molten pool.

The molten, glassified feed materials are withdrawn from the melter for subsequent processing. While any of a number of well known methods may be utilized to extract the molten feed material, applicant believes a weir-type arrangement will provide adequate control. Downstream processing of the molten feed material, including quenching, may take any form necessary to prepare the re-solidified feed material for permanent disposal, or for a productive use, such as a building or paving material.

DETAILED DESCRIPTION OF THE PREFERRED EMBODIMENTS

Figure 1:
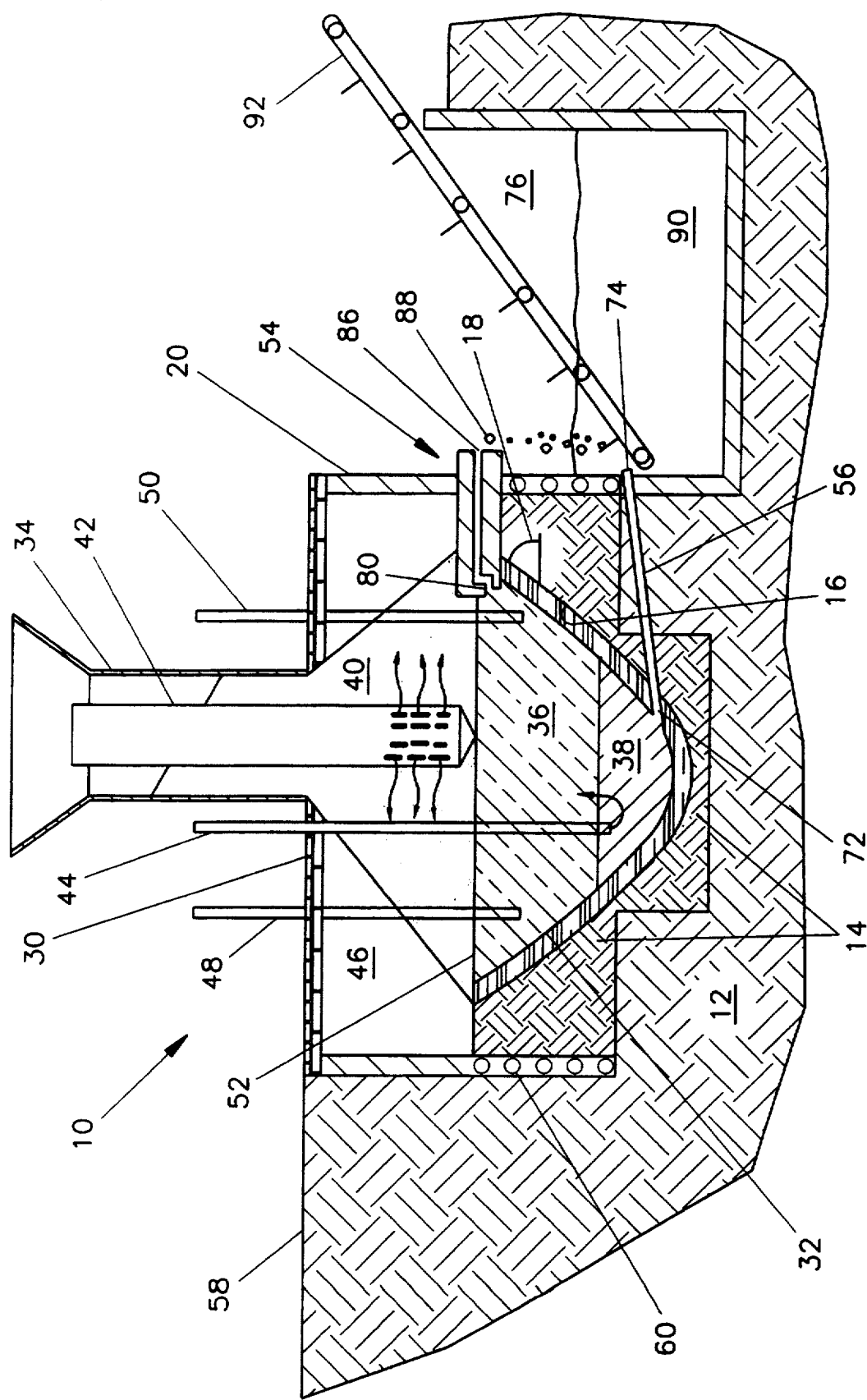
FIG. 1 is a schematic representation of the apparatus of the present invention.

The apparatus of the present invention may best be described by initially referring to the schematic illustrations of FIG. 1. The earth melter apparatus 10 is provided in an excavated area of native soils 12. Applicant has determined that the earth melter apparatus is advantageously constructed in excavated relatively undisturbed soils, as it is believed the thermal properties of such undisturbed soils or rock will provide optimal insulation for heating of feed materials in the apparatus 10. However, there may be instances when such thermal properties are not required or appropriate, and in such cases staged soils or selected low cost ores may be utilized to provide the base for construction of the earth melter. There are locations where appropriate rock formations are located essentially at grade level, and may be excavated for use therein without the need for additional lining, as set forth below. For example, basalt formations resulting from volcanic action often occur at ground level, and may be excavated in a predetermined fashion to form a melter of the present invention. It is also contemplated that the melter of the present invention can be constructed above ground, if appropriately contained within containment means. Therefore, it is to be understood that when the term "melter" is used hereinafter, such term contemplates a melter in any environment described above, unless otherwise delineated.

As will be described more fully below, the earth melter may be portable, utilizing local staged soils. The excavated area 14 may be provided in a number of different geometries, but it is believed that a depression having sidewalls 16 with an angle of repose 18 of from about 20 degrees to about 60 degrees from the horizontal is preferable. The natural angle of repose for the excavated cavity permits the simplest form for low cost construction. Later during operation, the lining may be renewed, if required, by additions of selected materials through simple addition around the periphery. The added material then tumbles into corroded/eroded zones. The excavated area may be surrounded by a containment means 20, generally in the form of a metal wall, separated from the sidewalls 16 by at least two feet of containment materials. The excavated area is enclosed above ground by cover means 30. The cover 30 may be of any geometry and materials consistent with maintaining adequate retention of the off-gases and heat from the process and other attributes described below.

The sidewalls 16 may be lined with a backfill material 32 having a higher insulating value or a material with greater resistance to corrosion than the native soils provide. The backfill material 32 can be locally-obtained native materials such as rock or soils that are refractory and corrosion resistant. These would typically not melt at temperatures up to 1500° C. and be enriched in alumina, silica, zirconia, or magnesium with varying concentrations. Alternatively, this back fill could be made from waste brick and refractory from the metals and glass industries. The criteria for selection depends on cost, refractoriness and resistance to corrosion by the feed material being processed. Of course, if the melter is excavated in an appropriate rock formation (such as a basaltic formation), back fill may not be necessary, as the native rock formation can provide the required properties.

Feed material enters the melter through an inlet means 34 through the cover 30. The feed material is melted in the melter such that a melt pool of feed material 36 and a relatively more dense melt pool of heavier metals 38 is formed. After the feed material is initially melted, subsequent introduction of feed material causes an excess of feed material 40 to occur "floating" on the glass pool 36. An air inlet means 42 is positioned to introduce air into the excess feed material 40 to enhance the oxidation of all or a portion of the feed material.

Some feed materials can either contain free metals or be reduced during the melting process and accumulate beneath the molten pool as indicated 38. One strategy is to oxidize these accumulated metals to an oxide to become more soluble in the molten glass 36. This can be effected by injecting air or gases enriched in oxygen through a conduit 44. The conduit can be inserted directly in the molten pool 38 or in the molten pool 36. For the later case, the molten glass 36 becomes oxidized which later contacts and oxidizes the molten metal 38. If the conduit is inserted into the molten pool 36, the introduction of gasses can cause disturbance of the molten pool and assist homogenization of the molten materials therein.

Those skilled in this art will recognize that the feed material may take many different forms. For example, rather than being an accumulation of waste products produced by man (such as medical wastes), the feed material may consist of, e.g. soils contaminated by hazardous chemicals. In such case, the "glass pool" may not fall within the generally accepted definition of "glass". In the case of soil, the "glass" may be a lava-like mass. Therefore, as used herein, the term "glass" is used generically to define the melted feed material, in whatever form it takes.

The feed material may be melted initially by a number of different processes, however after the glassification process has begun, it is most effective to maintain the active melt with electric electrodes. For example, the feed material can be initially melted by hot gases from gas fired burners, which after the process begins, can be turned off and the melt maintained by electrodes 48 and 50. If the feed material is combustible, the feed material is ignited and the hot gasses produced thereby can be retained within the air space 46 and be used to preheat or melt the ash produced by such combustion.

Electrodes 48, 50 dissipate electrical energy through the molten pool 36 and assist in maintaining the molten condition of the molten glass pool 36. However, applicant believes an equally important function of the electrodes is to induce and maintain convection within the glass pool 36. Such convection maintains a homogeneous glass pool and prevents unwanted stratification of the pool. It is unlikely that the electrodes will be utilized to initially create the glass pool 38 or molten metal pool 38, but they may be used to maintain the molten condition thereof, and to melt the ash produced by combustion of the feed material. If sufficient heat is either generated by combustion or injected, and if means to agitate the melt pool 36 are present, electrodes may be unnecessary.

Molten feed materials may be withdrawn by any conventional means. For example, the molten pool of glass 36 may be continuously withdrawn into a weir 54 for further processing, and the molten metal pool 38 may be either continuously or intermittently withdrawn through a tap 56. While it is believed that optimum operation of the present invention will occur in a continuous mode, it is possible to operate the melter in a batch-wise manner, both in the feed material input, and in the withdraw of the molten pools.

More particularly, the apparatus 10 of the present invention is provided in an excavated area of previously undisturbed soil. The grade level 58 represents the upper portion of the melter body. Undisturbed soil 12 has been excavated into a cup-shaped depression having side walls 16 with an angle of about 45 degrees. While this angle can be from about 20 degrees to about 60 degrees, Applicant has found that low cost results are obtained with an angle of about 45 degrees. The selection of the side wall angle is dependant on the angle of repose for the back fill or native materials, melter depth and the minimum surface area required to process the feed material. The soil 12 is then overlain with a quantity of selected back fill 32 to a thickness of about one to three feet.

The thickness of the material depends on the back fill material selected and its expected service. When the back fill is more corrosion resistant, less material is required. The dimensions of the excavated area will depend upon the desired capacity of the apparatus. For example, a melter with a capacity to process 50 tons of feed material per day would have an outside diameter of about 32 feet, while a capacity of 100 tons/day would require a diameter of about 40 feet.

This outside diameter depends on several variables including the typical melting rate of the feed material, the viscosity of the melting material, its corrosiveness to the fill material, the electrode placement, and the depth the electrode penetrates into the molten material. The general character of the melter's dimensions are as follows. The area inside the circle which contains the electrodes must be sufficient to melt the feed material at the desired rate. Typical feed materials require from 3 to 6 square feet of surface area per ton per day to be melted. Next, a separation between the high convection of the melted material around the electrode and the inside containment material is selected. The wall is set out sufficiently to maintain a nearly quiescent zone of molten material adjacent the containment material. This assures low corrosion and nearly unlimited containment life. For molten MSW ash glass, we found this distance to be about four to six feet. For a different molten material and different electrode arrangement, this distance may differ.

The containment wall 20 may contain cooling means, such as an annular space or conduits 60 carrying either cooled water, air or other heat transfer means. When the containment wall 20 is cooled, the corrosion and potential leakage of the molten material 36 is essentially precluded. While not required in all cases, applicant believes that containment wall 20 which includes cooling will prolong the life of the melter significantly.

To assume the most reliable, prolonged life, the cooled containment wall needs to extend down at least to the depth of the electrodes 48, 50. A more conservative approach is to extend the cooled wall down to the bottom of the molten pools 36 and 38.

Above the level of grade 58, the containment wall 20 may support a cover 30 which completely encloses the melter 10. The cover 30 can be provided in any convenient cross-sectional geometry, however it is believed that a cover extending substantially horizontally across the melter at about the level of the initial grade 58 will provide the most reliable and convenient access to the interior. However, the cover may be designed to extend substantially above the grade level, as in a dome-shaped design.

Feed material inlet means 34 typically takes the form of a large diameter conduit capable of handling the entire throughput of feed materials. When feed material is initially fed through the inlet means 34 during continuous operation, it is combusted and turned to ash. Addition of combustion air (and a hydrocarbon to assist combustion, if necessary) facilitates the initial conversion of feed material to ash. The hot air within the melter (produced either from combustion of feed materials or injected into the melter) converts the ash to a molten condition. Thereafter, an excess 40 of feed material accumulates above the glass pool and is continuously combusted into ash and then glassified by contact with the glass pool, and enters the glass pool. Air is fed into the interior portion of the excess feed material 40 through air inlet means 42 to assist the combustion of the feed material 40.

A tap, such as molten metal tap 56, extends through the sidewall 16 and into the lower, denser molten pool 38, the metal pool. The tap 56 enables the quantity of molten metals in this pool to be regulated (withdrawn) without decanting the entirety of the glass pool 36 thereabove. This tap can also be used to drain the entire glass content 36. The tap 56 is provided with an inlet end 72 and a discharge end 74. The discharge end 74 is positioned in a process area 76 excavated adjacent to the melter 10.

The process area 76 may also contain apparatus necessary to initially prepare the glass 36 and metals 38 for subsequent productive use or disposal. It is to be understood that the particular apparatus described herein and illustrated in the Figures is merely illustrative, and that numerous other embodiments are within the comprehension of one having ordinary skill in this art. In particular, the process area contains continuous discharge means, generally designated 54, for initial removal of excess glass at 80. The discharge means 54 is provided with a weir 80 to maintain a constant upper glass pool level 52 and to continuously remove glassified material from beneath the glass surface 52. The weir outlet 86 discharges into a cooling area, wherein the liquid glass material is cooled and solidified 88. For example, the liquid glass stream exiting through outlet 86 may be dispersed with a water stream into a shape which is thereafter quickly cooled (as by immersion in a quench tank 90). The glass is then susceptible to removal, as by conveyor 92, for further processing.

Figure 3:
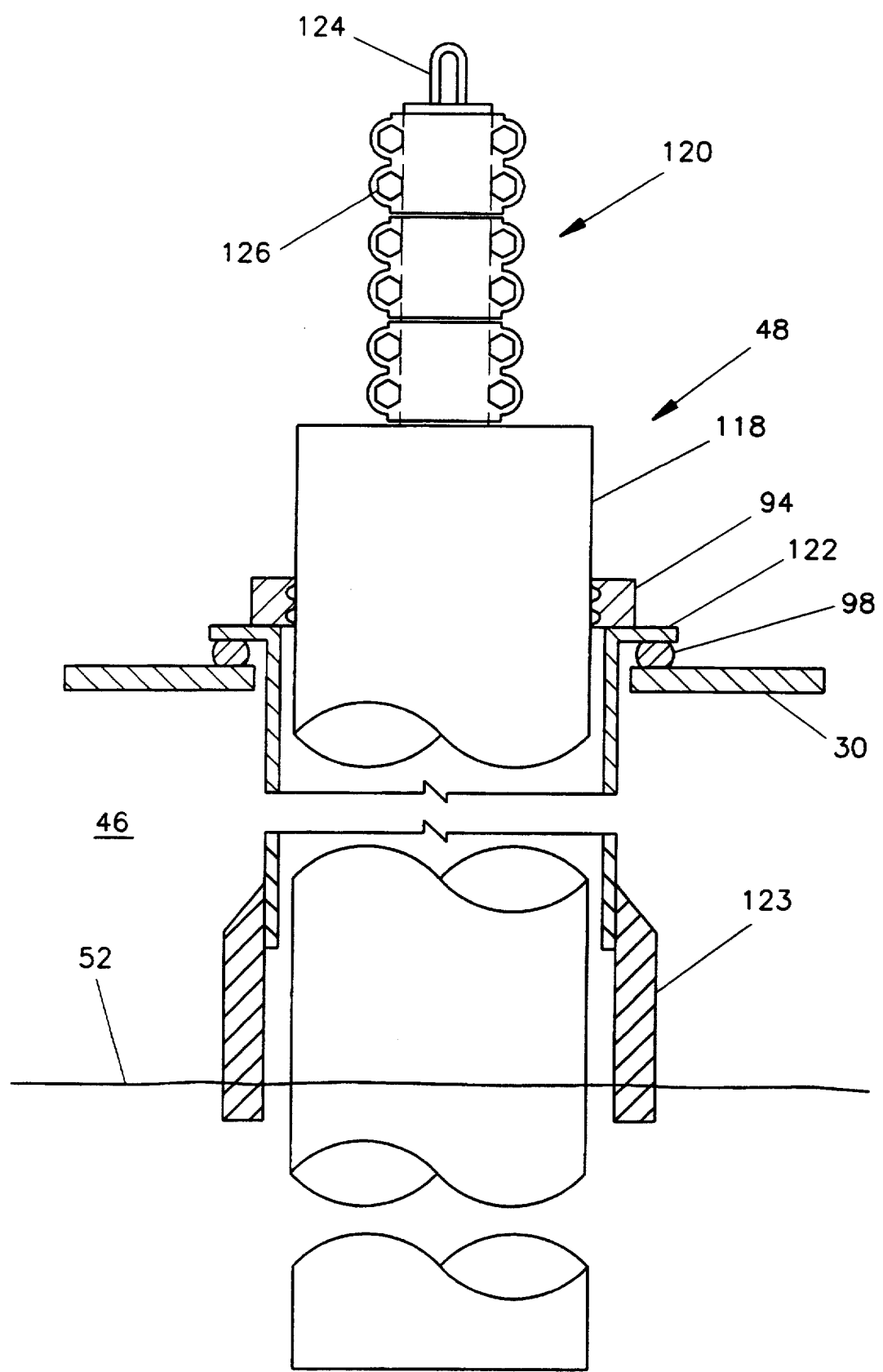
FIG. 3 is a schematic, longitudinal section view of an electrode of the present invention.

Applicant has found that the melting of feed materials proceeds most effectively and with the least technical problems if the glassification (melting) occurs due to heat generated by the combustion of the feed materials, while induction of current through the glass pool provided by at least two spaced-apart electrodes 48 and 50 maintains the molten pool in a homogeneous, non-stratified condition. The electrodes (shown in greater detail in FIG. 3, are lowered through the cover 30 and extend a sufficient distance into the glass pool 36 to insure that sufficient current passes through the pool 36 to maintain the temperature above the melting point of the feed material.

Transmission of electric current through and heating thereby of molten material 36 is important for molten material that contain compounds that readily absorbs thermal radiation such as oxides of iron and chromium. For these common compounds transmission of heat by radiation is low at high temperatures and can lead to unmelted material relatively short distances from the molten surface 52. Insertion of the electrodes 48, 50 should be sufficient for adequate conduction but not excessive. The bottom end of the electrode should be above the molten metal pool 38 sufficiently to avoid shorting of the electric path and substantial loss of heating of the molten pool 36. Further, when inserted too far into the molten pool, excessive convection can be induced from the electrodes which can then induce more rapid corrosion/erosion on the containment walls 18 and shorten the melters' life. Although dependant of the depth of the molten material 36, we have found that the distance from the bottom of the electrode to the top of the molten metal 38 should be (i) more than 2 feet to avoid significant shorting and (ii) about half the depth of the molten material 36 to minimize excessive convection corrosion. For example, the electrodes may extend about three feet below the surface of glass pool 36. As with the feed material inlet means 34 and the air inlet means 44, the electrodes are secured within the cover member 30 in an air tight manner with seal means 94 between the electrodes and the cover member 30.

In the event that excessive or unacceptable corrosion of the side walls occurs, the integrity can be restored by adding additional backfill material, or if none had previously been utilized, adding backfill to the side walls for the first time. Such additional backfill can be added by shutting down the apparatus, or if appropriate means have been provided (such as access doors through the cover), the backfill can be added while the apparatus is in operation. Of course, in the latter case, the backfill must be refractory grade in order to withstand being applied through the molten pools of materials.

The airspace 46 between the cover 30 and the upper surface 52 of glass pool 36 is defined by the angle of repose of the feed material, the electrode spacing and the outside extent of the containment walls. For feeds containing significant organics, this airspace 46 is typically adequate for gas residence time in excess of several seconds and if adequately oxygenate can insure complete oxidation of organics.

Figure 2:
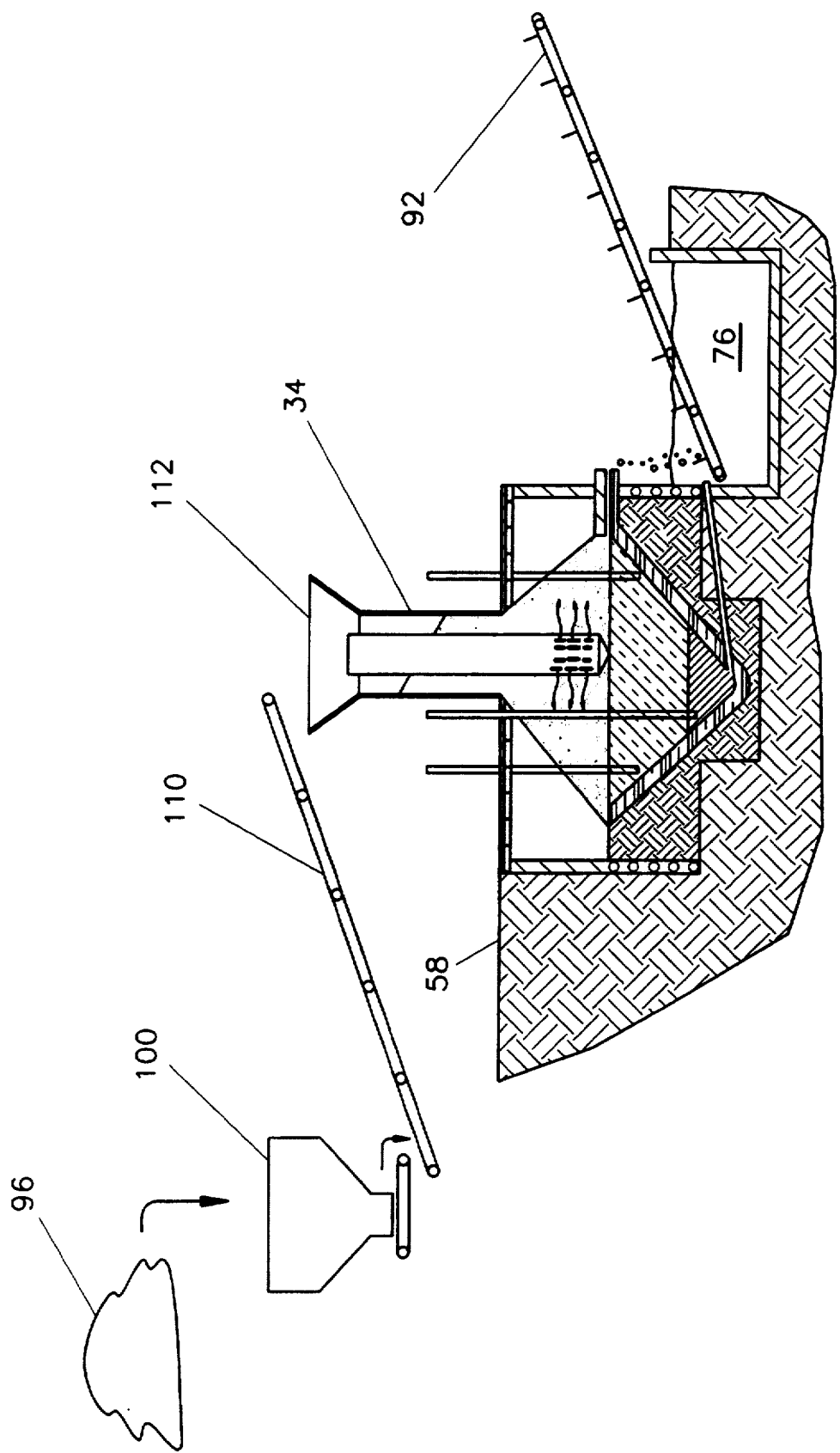
FIG. 2 is a schematic representation of the apparatus of the present invention illustrating additional features.

Somewhat more schematically, FIG. 2 illustrates the environment of the invention of FIG. 1. Feed material, such as incinerator ash from a municipal solid waste incinerator, is collected in an "ash pile" 96. This ash is loaded into an interim storage device 100, from whence it is metered by conveyor 110 to the instant invention. The feed materials enter a hopper 112 at the upper end of the feed material inlet means 34. Chemicals may be added to the feed material stream to enhance glassification, such as fluxes using alkali salts and glass formers such as silica, alumina or phosphates to assure the molten glass achieves the required leach resistance.

Reducing agents to reduce and precipitate or volatilize metals such as iron, nickel, copper, arsenic, selenium, silver, antimony, lead can be provided. Reducing agents can effect the formation and coalescence of higher density valued metals which collect on the bottom of the melter 38. Alternatively, these metals can be volatilized and concentrated in the off-gas system where recovery and reuse can be effected. The accumulation of these metals may be reduced or eliminated by injection air, or another gas enriched with oxygen, into the molten metal pool 38.

An excess 40 of feed material builds up within the inlet means 34 and above the molten glass pool 36. Excess molten glass is removed with weir 80 and after quenching by conveyor or screw 92.

Air is introduced into the melter through air inlet 42 in order to assist oxidation of the feed material, effect preheating of the feed material and to minimize the pressure drop through the bed of excess feed material 40. For the process that seeks a predominant oxide melt 36, the moisture needs to be removed, organic materials need to be decomposed/oxidized and residual char or carbon needs to be oxidized. Placement of the air inlet 42 within the excess feed material effects these results with a minimum amount of gas pressure while accomplishing drying, oxidization and preheating of the feed material. Melting of feed materials typically low in combustibles can be made more economic by the purposeful addition of fossil fuels such as coal or combustible solid wastes with the feed material.

Preheating the air entering through air inlet means 42 will improve the efficiency of melter. The inlet air may be heated by heat exchange means (not shown) located in the off-gas stream of the melter. This method will increase the efficiency of the melter process. Alternatively, a gas fired torch fired into the air stream with sufficient heat duty to preheat the air may be located immediately above the melter.

The preferred electrode design with the apparatus of the present invention will be a matter of choice depending on many process and apparatus variables. A representative electrode design is illustrated in FIG. 3, wherein the electrode comprises a main body portion 118, electrical attachment means 120, seals 94, 98 and sheath 122. The electrical components of the electrode 48 are raised and lowered into position by affixing an overhead lifting means, such as a crane (not shown) to the hoist ring 124. While it is believed to be less desirable, the electrodes can be arranged other than by suspending them from above—they can be inserted at an angle into the glass pool, and can even be provided in a horizontal alignment entering the glass pool. When provided with a cooled protective sheath 122, and a cooled protective collar 123, the electrode may be maintained at a temperature ("cooled") below the oxidation temperature of the electrode in the air space 46, thereby prolonging the effective life of the electrode.

A plurality of electric cables and clamps 126 are affixed at an upper end of the electrode 48. The main body portion 118 may be made of a number of different refractory materials such as graphite, molybdenum or tungsten. Such electrodes are relatively non-consumable and will not require frequent renewal. However, renewal of the electrode will be required from time to time. When a sufficient reserve of the main body portion extends above the cover 30, the consumed portion within the molten pool 36 can be simply renewed by lowering the main body 118 by means of the hoist ring 124.

When insufficient reserve of the main body is present above the cover 30, after de-energizing, the main body is secured by the clamping mechanism 126, the electrode attachment means 120 is removed and additional main body is connected. To place the electrode back into operation the above steps are completed essentially in reverse order.

The gas seals 94 and 98 and sheath 122 isolate the electrode body 118. This isolation blocks access of oxygen in the air to the electrode which would otherwise cause rapid losses of the main body 118.

The present invention has been shown and described in a manner sufficient to enable one skilled in this art to reproduce the invention. However, as will be readily obvious to such skilled artisan, numerous alternative modes of construction or operation of this invention are possible after access to the accompanying disclosure. The scope of this invention should not therefore be deemed limited by the scope of the specification set forth above, but rather only by the scope of the claims appended hereto.

I claim:

1. An apparatus for melting feed materials for subsequent use or safe disposal in a relatively harmless condition, said apparatus comprising:
    (a) side walls defining an excavated area in a quantity of soil or rock comprising a melt zone for melting the feed materials;
    (b) a cover extending over the side walls and defining an air-filled space between a quantity of melted feed materials and the cover;
    (c) feed material inlet means extending through the cover to permit feed materials to be introduced onto the melt zone;
    (d) means for heating the feed material such that a molten pool of feed materials is produced in the melt zone; and
    (e) means to withdraw the molten pool of feed materials from the melt zone.

2. The apparatus as recited in claim 1, wherein the apparatus is constructed in relatively undisturbed native soil or rock.

3. The apparatus as recited in claim 2, wherein the apparatus is constructed of native soil transported to a construction area and retained within an area excavated in native, relatively undisturbed soil.

4. The apparatus as recited in claim 1, wherein the apparatus is constructed of native soil transported to a construction area and retained within a containment vessel.

5. The apparatus as recited in claim 3, wherein the angle of the sidewalls relative to a horizontal through the apparatus is between about 20 degrees and about 60 degrees.

6. The apparatus as recited in claim 4, wherein the angle of the sidewalls relative to a horizontal through the apparatus is between about 20 degrees and about 60 degrees.

7. The apparatus as recited in claim 1, wherein a backfill portion lines the melt zone.

8. The apparatus as recited in claim 7, wherein the backfill portion is selected from the group consisting of native soil, earth ores, boulders/rocks, sand, clay, refractory seconds or used refractory material, and mixtures thereof.

9. The apparatus as recited in claim 1, wherein a containment wall surrounds a portion of the excavated area and extends downwardly to a position adjacent a subsurface portion of the excavated area.

10. The apparatus as recited in claim 9, wherein the containment wall extends downwardly to a position at least as deep as a lowermost portion of the excavated area.

11. The apparatus as recited in claim 9, wherein the containment wall comprises cooling means therein sufficient to cool a portion of the quantity of soil surrounding the excavated area.

12. The apparatus as recited in claim 11, wherein the cooling means comprises a conduit within the containment wall having a quantity of coolant dispersed therethrough.

13. The apparatus as recited in claim 1, wherein the cover comprises exhaust elements to remove gasses generated within the apparatus.

14. The apparatus as recited in claim 1 wherein the feed material inlet means provides an excess of feed material within the apparatus in a space between the molten pool and the cover.

15. The apparatus as recited in claim 14, wherein gas inlet means is provided in a co-axial relationship with the feed material inlet means.

16. The apparatus as recited in claim 1, wherein the means for heating the feed material comprise a gas-fired heat source for generating high temperature gases for introduction into the apparatus sufficient to melt the feed materials.

17. The apparatus as recited in claim 1, comprising means to inject gasses into the molten pool of feed materials.

18. The apparatus as recited in claim 1, wherein the means for heating the feed material comprise a plurality of electrodes immersed in the molten pool of feed materials.

19. The apparatus as recited in claim 18 wherein the electrodes are constructed from at least one of the materials selected form the group consisting of graphite, molybdenum, tungsten, silicon carbide, iron, chromium, nickel, and molybdenum disilicide or combinations thereof.

20. The apparatus as recited in claim 18, wherein the electrodes are provided with protective sheath means to cool the electrode below the oxidation temperature of the electrode in that portion of the electrode above the molten pool of feed material.

21. The apparatus as recited in claim 18, wherein the electrodes are arranged in substantially vertical position.

22. The apparatus as recited in claim 18, wherein the electrodes are sacrificial electrodes which are consumed.

23. The apparatus as recited in claim 1, wherein the apparatus comprises a metal discharge tap to remove molten metals from a lowermost portion of the melt zone.

24. Apparatus for melting feed materials for subsequent productive use or disposal in a relatively harmless condition, comprising:
   (a) side walls defining an excavated area in a quantity of soil, comprising a melt zone for melting the feed materials;
   (b) a backfill portion lining the melt zone;
   (c) a containment wall substantially surrounding the melt zone and extending downwardly into the soil;
   (d) a cover extending over the melt zone and defining an air-filled space between the melt zone and the cover;
   (e) feed material inlet means extending through the cover to permit feed materials to be introduced into the melt zone;
   (f) a plurality of electrodes for maintaining a molten pool of feed materials in the melt zone; and
   (g) means to withdraw molten feed materials from the molten pool.

25. The apparatus as recited in claim 24, wherein the excavated area is excavated from rock.

26. The apparatus as recited in claim 24, wherein, the backfill is selected from the group consisting of native soil, earth ores, boulders/rocks, sand, clay, refractory seconds or used refractory material, and mixtures thereof.

27. The apparatus as recited in claim 24, wherein the containment wall is provided with cooling means to maintain the temperature of the soil adjacent the containment wall cooler than the temperature of the soil adjacent the side walls.

28. The apparatus as recited in claim 24, wherein the feed material inlet means comprises air inlet means to assist combustion of the feed materials.

29. The apparatus as recited in claim 24, wherein the means to withdraw molten feed materials comprises a weir.

30. The apparatus as recited in claim 24, wherein the electrodes are shielded with a protective sleeve which shields the electrode from the air in the air-filled space.

31. The apparatus as recited in claim 24, wherein an oxygen-containing gas is injected into the molten pool of metals or less directly by injecting an oxygen-containing gas into the molten pool of feed materials.

32. A method of disposing of feed materials, wherein an earth melter is constructed of native soils, comprising the steps of:
   (a) excavating an area of soil or rock to provide a melt zone;
   (b) covering the excavated area with a cover;
   (c) feeding waste materials into the melt zone through the cover;
   (d) heating the waste materials such that a melt pool of melted waste materials is produced in the melt zone; and
   (e) withdrawing the melted waste materials from the melt zone.

33. The method of claim 32, further comprising excavating the soil or rock from a quantity of relatively undisturbed native soil or rock.

34. The method of claim 32, further comprising excavating the soil or rock from a quantity of soil or rock staged to an area remote from a source of origin.

35. The method of claim 32, further comprising lining the melt zone with a back fill material having improved thermal insulation and corrosion resistance than the native soil or rock.

36. The method of claim 32, further comprising surrounding the excavated area with a containment wall.

37. The method of claim 36, further comprising cooling the containment wall with cooling means.

38. The method of claim 32, further comprising feeding the waste materials onto the melter such that the waste materials are combusted within the melt zone.

39. The method of claim 32, further comprising introducing a hydrocarbon with the waste material to induce preheating and combustion of the waste materials.

40. The method of claim 32, further comprising renewing a corroded portion of the excavated area by backfilling backfill material into the excavated area.

41. The method of claim 40, further comprising backfilling the backfill material through the cover.

* * * * *

UNITED STATES PATENT AND TRADEMARK OFFICE
CERTIFICATE OF CORRECTION

PATENT NO. : 5,354,355
DATED : Oct. 11, 1994
INVENTOR(S) : CC Chapman

It is certified that error appears in the above-indentified patent and that said Letters Patent is hereby corrected as shown below:

In column 1, lines 5-8, please delete the paragraph
--This invention was made with Government support under Contract DE-AC06-76RLO 1830 awarded by the U.S. Department of Energy. The Government has certain rights in the invention.--

In column 5, line 14, please change "gasses" to --gases--.

In claim 13, column 10, line 63, please change "gasses" to --gases--.

In claim 17, column 11, line 10, please change "gasses" to --gases--.

In claim 26, column 11, line 59, after the word "backfill" please insert the word --portion--.

Signed and Sealed this

Sixteenth Day of May, 1995

Attest:

BRUCE LEHMAN

Attesting Officer

Commissioner of Patents and Trademarks